United States Patent [19]

Yang et al.

[11] Patent Number: 4,983,708

[45] Date of Patent: Jan. 8, 1991

[54] NOVEL POLYACETAL COPOLYMERS OF TRIOXANE AND GLYCIDYL ESTER DERIVATIVES

[75] Inventors: Nan L. Yang, Staten Island, N.Y.; Andrew Auerbach, Livingston, N.J.; Rose. Pesce, College Point, N.Y.; Jerry A. Broussard; James L. Paul, both of Summit, N.J.

[73] Assignee: Hoechst Celanese Corporation, Somerville, N.J.

[21] Appl. No.: 350,782

[22] Filed: May 12, 1989

[51] Int. Cl.$^5$ .............................................. C08G 4/00
[52] U.S. Cl. ................................. 528/230; 528/241; 528/245; 528/246; 528/247; 528/393; 528/394
[58] Field of Search ............... 528/230, 241, 245, 246, 528/247, 393, 394

[56] References Cited

U.S. PATENT DOCUMENTS 4,847,332 7/1989 Yu ........................................ 525/398
4,876,368 10/1989 Broussard et al. ................... 549/374

Primary Examiner—John Kight, III
Assistant Examiner—Sam A. Acquah
Attorney, Agent, or Firm—Nixon & Vanderhye

[57] ABSTRACT

Cationic copolymerization of trioxane with glycidyl ester derivatives, preferably glycidyl acrylate derivatives, produces thermally stable, usually cross-linked, acetal copolymer. The resulting acetal copolymer will exhibit side chain ester functionality, and particularly side chain vinyl functionality when glycidyl acrylate derivatives are employed, so as to permit its futher reaction with other chemical moieties to achieve an acetal copolymer of modified chemical and/or physical properties.

19 Claims, 1 Drawing Sheet

NOVEL POLYACETAL COPOLYMERS OF TRIOXANE AND GLYCIDYL ESTER DERIVATIVES

FIELD OF THE INVENTION

This invention relates to acetal polymers which are structurally related to polyoxymethylene (i.e., polymers having recurring —$CH_2O$—units). More specifically, the invention relates to a novel class of acetal copolymers formed by the copolymerization of the trioxane and glycidyl ester derivatives.

BACKGROUND AND SUMMARY OF THE INVENTION

Acetal polymers represent an important class of engineering resins due to numerous favorable physical properties. For this reason, acetal polymers have a wide range of commercial applications, for example, as parts for automobiles, as plumbing components and a variety of household and personal products.

It is oftentimes desireable to modify one or more of the inherently advantageous physical properties of acetal polymers so as to meet the needs of specific end-use applications. Normally, to achieve such modified properties, acetal polymers have been blended with a variety of other resins and/or ingredients (e.g., impact modifying agents, flame retardants, light and heat stabilizers, fillers, and the like). Usually the blending of acetal polymers is not without its own problems due principally to the highly crystalline nature of acetal polymers which is evident in a low level of compatibility with other polymers.

Grafting of a different resin and/or a specific chemical moiety onto a polyacetal backbone would present an attractive alternative to blending so as to achieve a block copolymer having the desired modified physical and/or chemical properties. However, with acetal polymers, grafting is usually not possible due to the low level of polyacetal end group functionality—that is, since each acetal copolymer molecule carries a maximum of two functional groups, e.g., hydroxyl end groups.

According to the present invention, however, a novel class of polyacetal copolymers is provided which retain the benficial physical and chemical properties of conventional acetal polymers, while yet also providing greatly increased functionality. Therefore, the acetal copolymers of this invention may be reacted with other resins and/or chemical moieties so as to, for example, permit a variety of acetal polymers to be synthesized having chemically bound (i.e., not merely blended) modifiying agents.

Broadly, the copolymers of the present invention are obtained by the cationic copolymerization of trioxane with a functional glycidyl ester which, in the preferred embodiment in accordance with this invention, is a glycidyl acrylate. The resulting copolymer will therefore exhibit side chain funtionality so as to enable synthesis of, for example, block copolymers comprised of the acetal copolymer of this invention and other specific polymers to achieve desired chemical and/or physical properties.

These, as well as other aspects and advantages of the present invention will become more clear after careful consideration is give to the following detailed description of the preferred exemplary embodiments.

BRIEF DESCRIPTION OF THE ACCOMPANYING DRAWINGS

Reference will hereinafter be made to the accompanying drawings wherein;

FIG. 1 is a TGA plot showing the thermal stability of a copolymer of the present invention in comparison to a trioxane-ethylene oxide copolymer.

DETAILED DESCRIPTION OF THE PREFERRED EXEMPLARY EMBODIMENTS

Figure 1:
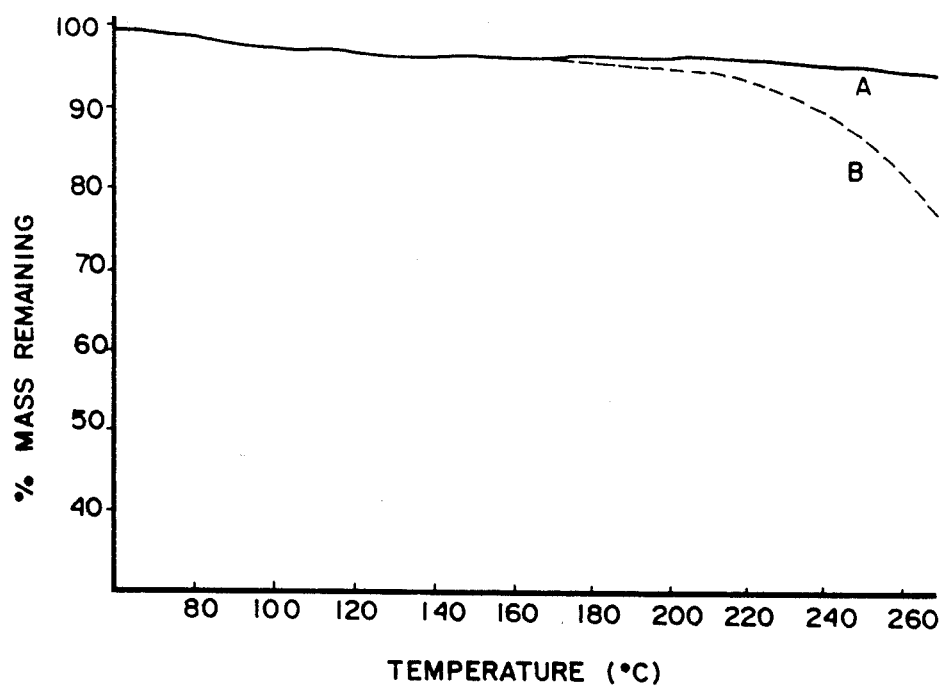

The glycidyl derivatives useful as a comonomer in the cationic copolymerization with trioxane according to the present invention are of the general Formula I:

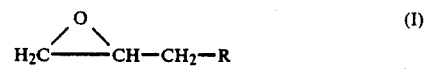

where R is an ester radical having 2 to 20 carbon atoms. Suitable ester radicals include, for example, saturated aliphatic esters, unsaturated aliphatic esters, substituted saturated aliphatic esters, and aromatic esters (e.g., benzoic acid). Thus, for example, R may be represented by the formulas

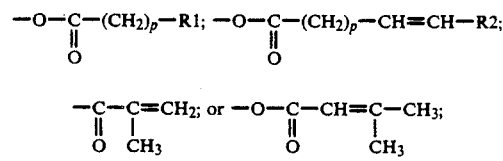

where each p is an integer from zero to 8, R1 is a methyl or phenyl radical, and R2 is hydrogen or a methyl or phenyl radical.

The resulting copolymer will have oxymethylene units (—$CH_2O$—) interspersed with units derived from the glycidyl comonomer. The functionalized moieties will thus be present in the copolymer as pendant groups along the copolymer's backbone as represented by the structural Formula II (exclusive of chain terminating groups):

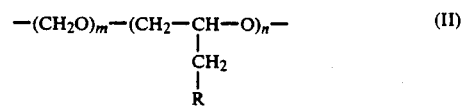

where the pendant functional group R is as defined above, and m and n are each integers such that m+n is between 5 to 20000, and the mole ratio of units of subscript n to the units of subscript m is between about 1:5000 to 1:1, and preferably less than about 1:20.

As will be observed, the acetal copolymers of the invention exhibit side chain ester functionality and, when acrylate substituents are employed, vinyl side chain functionality. These functional groups in the polymer's side chains thus provide a convenient site for further reaction with another polymer to form a block copolymer and/or to react with other chemical moieties so as to provide an acetal copolymer with modified chemical and/or physical properties as may be desired.

The preferred glycidyl derivative employed as a comonomer in the cationic reaction with trioxane is glycidyl acrylate (i.e., a monomer of Formula I where X is represented by

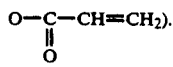

When glycidyl acrylate is employed as the comonomer in reactions with trioxane, it is preferred that the cationic copolymerization of these comonomers be carried out with greater than 0.7 mole% glycidyl acrylate in the polymerization zone. At glycidyl acrylate feeds of greater than 0.7 mole%, the resulting acetal copolymer, after base hydrolysis, is insoluble in hexafluoroisopropanol, and boiling dimethyl sulfoxide (DMSO) and dimethyl formamide (DMF). Copolymers obtained with a glycidyl acrylate feed of less than 0.7 mole% gave only an NMR signal indicative of methylene oxide, and thus were concluded to be polyoxymethylene homopolymer (i.e., having no glycidyl acrylate comonomer incorporation in the polymer chain).

The copolymers of the Formula II above will usually be cross-linked via the pendant functional group (e.g., the acrylate group when glycidyl acrylate is employed as the comonomer) acting as a cross-linking agent. Thus, the copolymers according to the invention will usually exhibit a low crystallinity, for example less than about 40%. When glycidyl acrylate is employed as the comonomer, it will usually be incorporated into the polymer chain in an amount of greater than about 1.0 mole%.

The preferred catalysts used in the preparation of the copolymers of the present invention are boron trifluoride and its coordination complexes with organic compounds in which oxygen or sulfur is the donor atom. The coordination complexes of boron trifluoride may, for example, be a complex with a phenol, an ether, an ester, or a dialkyl sulfide. Boron trifluoride etherate ($BF_3 \cdot Et_2O$) is the preferred coordination complex used in the cationic copolymerization processes of the present invention. In general, the boron trifluoride or its coordination complex should be present in the polymerization zone in amounts such that the boron fluoride content is between about 1 to 10000 ppm, preferably 10 to 1000 ppm.

Monomers other than trioxane and glycidyl ester derivatives may also be employed in the practice of this invention so as to form terpolymers or tetrapolymers—that is, a polymer having units in the chain derived from trioxane, glycidyl ester derivatives, and additional monomer(s) which may be employed. In general, these additional monomers that may be employed are cyclic ethers or cyclic acetals, with ethylene oxide, 1,3-dioxolane, 1,3-dioxepane, 1,3-dioxep-5-ene, and 1,3,5-trioxepane being particularly preferred.

As used herein and in the accompanying claims, the term "copolymer" is intended to encompass any polymer having, as at least part of the polymer chain, structural units derived from trioxane and glycidyl ester derivatives. Thus, the term "copolymer" as used herein and in the accompanying claims is intended to encompass terpolymers, tetrapolymers, and the like which include structural units in the polymer chain derived from trioxane and glycidyl ester derivatives, in addition to other units derived from, e.g., the cyclic ether or cyclic acetal monomers described above, if present during polymerization.

The acetal copolymers of this invention may be formed by either bulk or solution polymerization processes. In the solution polymerization process, for example, the trioxane, glycidyl ester derivative, and catalyst are dissolved in a common anhydrous solvent, such as cyclohexane, and permitted to react in a sealed reaction zone. The temperature in the reaction zone may vary from about 0° C. to about 100° C. When employing bulk copolymerization techniques, the temperature in the reaction zone may be greater than about 65° C but less than 100 to 110° C. The period of reaction may vary from about a few minutes to about 72 hours or more. Pressures from sub-atmospheric to about 100 atmospheres, or more may be used, although pressures between about 1 to 10 atmospheres are presently preferred.

The monomers in the reaction zone are preferably anhydrous or substantially anyhdrous. Small amounts of moisture, such as may be present in commercial grade reactants or may be introduced by contact with atmospheric air will not prevent polymerization, but should be essentially removed for best yields and to maximize molecular weights of the resulting copolymers.

During polymerization, some of the trioxane will react to form a homopolymer. In addition, unstable end groups formed in the copolymerization and unreacted monomer may be present after the reaction has proceeded for a sufficient time period. The trioxane homopolymer, the unstable end groups and/or any unreacted monomer may be removed by base hydrolysis so as to generate stable structures of the acetal copolymers of this invention. Generally, this base hydrolysis involves dissolving the crude copolymer in a suitable solvent (e.g., a 1:1 mixture of dimethylformamide and benzyl alcohol), and an organic amine (for example, triethanolamine)and maintaining the solution under reflux conditions until the visible evolution of formaldehyde ceases. The polymer may then be cooled to precipitate out the solid material.

The present invention is further illustrated by way of the following non-limiting examples.

EXAMPLES

The copolymers formed according to the following Examples were characterized both qualitatively and quantitatively by NMR spectroscopy using an IBM WP-200 SY FT NMR spectrometer operating at 200 MHz for protons at a temperature of 120° C, and DMSO-d6 as solvent with tetramethylsilane as an internal standard.

EXAMPLE I

Copolymerization of trioxane with glycidyl acrylate (Aldrich Chemical Co.) was accomplished as follows.

A. Purification of Trioxane

The trioxane used was distilled at 114° C. from sodium metal to remove water with benzophenone as indicator, under the protection of dry nitrogen. Two hundred grams of trioxane (Aldrich Co.) was placed in a 500 ml round bottom flask equipped with a magnetic stirrer. The system was heated to about 80° C., then 0.5 gram of sodium metal and 0.3 gram of benzophenone was added under stirring. When water was removed by sodium, the color of solution changed from light yellow to brown, then to blue. After the appearance of the blue color, the temperature was raised to about 114° C. for distillation. Early portions of the distillate were discarded. The collected later portions had a water content of about 40–70 ppm.

B. Copolymerization

A dry test tube (25mm×150mm) was charged with the trioxane and greater than 0.7 mole% glycidyl acrylate. The tube was then capped with a serum stopper, purged with nitrogen and evacuated. The contents of the tube were brought to a temperature of 65° C. The required amount of boron trifluoride etherate ($BF_3 \cdot Et_2O$) was then injected through the serum stopper into the completely molten mixture. 25-50 μl of initiator was used for a total monomer charge of 15-20 grams. Copolymerization tubes were vented by inserting a Pasteur pipet fitted with a drying tube, through the serum stopper so as to relieve the pressure build-up during polymerization. The polymerization was allowed to proceed for 20 hours. At the conclusion of the polymerization, the polymer was removed and pulverized in a Waring blender. The crude polymer was then stirred in 60 ml of methanol containing 1% triethanolamine (TEOA) for one hour so as to neutralize the initiator and then collected by filtration.

EXAMPLE II

Unstable end groups of the crude acetal copolymer obtained in Example I above were removed by base hydrolysis according to the following procedure.

The crude acetal copolymer, dimethylformamide (120 ml), benzyl alcohol (120 ml) and triethanolamine (1% of total volume) were placed in a 500 ml, two-necked round bottom flask fitted with a thermometer and an air-cooled, straight-through condenser. The mixture was heated and stirred at 160-170° C. to dissolve the solid. The contents were maintained at refluxing conditions until evolution of formaldehyde was no longer visible. The polymer solution was cooled to room temperature and the solid polymer was collected and washed with acetone three times. The polymer was then filtered and dried under vacuum at 40° C. $^1H$ NMR spectra confirmed that the glycidyl acrylate comonomer had been incorporated into the copolymer chain.

EXAMPLE III

Thermogravimetric analysis (TGA) thermograms were obtained on a DuPont 990 Thermogravimetric Analyzer under nitrogen with a heating rate of 10° C./min. and a nitrogen flow rate of 50 ml/min. Accompanying FIG. 1 is a TGA plot of a trioxane-glycidyl acrylate copolymer according to this invention (trace A) in comparison to a trioxane-ethylene oxide copolymer (trace B).

EXAMPLE IV

Samples of acetal copolymers according to the present invention ranging in mass from 2 mg to 4 mg were subjected to differential scanning calorimetry (DSC) and analyzed with a DSC cell. The samples were heated rapidly to a temperature of 120° C. and then heated further at a rate of 10° C./min. Heat of fusion $\Delta H_f$ was calculated by the time base method, using a weighed indium sample as standard. Percent crystallinity was based on a heat of fusion equal to 58.7 cal/g for 100% crystallinity. Table 1 below sets forth the data obtained in comparison to a trioxane-ethylene oxide copolymer with 1.4 mole% ethylene oxide incorporation.

TABLE 1

| Heat of fusion and percent crystallinity of trioxane glycidyl acrylate and trioxane ethylene oxide copolymers | | |
|---|---|---|
| Comonomer incorp. mole percent | $\Delta H_f$ (mcal/mg) | Percent crystallinity |
| 1.0 (GA) | 21 | 35 |
| 2.4 (GA) | 7 | 11 |
| 1.4* (EO) | 35 | 60 |
| 0‡ | 58.7 | 100 |

*1.4 mole percent ethylene oxide incorporation
‡ hypothetical 100% crystalline POM homopolymer The above data show that increased incorporation of units derived from the glycidyl acrylate comonomer decreases the crystallinity of the resulting copolymer.

EXAMPLE V (COMPARATIVE)

Example I was repeated except that less then 0.7 mole% of glycidyl acrylate was employed in the reaction mixture. NMR spectra for the resulting base hydrolyzed polymer showed only a signal indicative of methylene oxide. Hence, it was concluded that no glycidyl acrylate comonomer was incorporated in the polymer chain and that the resulting product was polyoxymethylene homopolymer.

As is evident from the Examples above, the present invention achieves novel acetal copolymers via the cationic copolymerization of trioxane and glycidyl ester derivatives. The acetal copolymers will, moreover, have pendant ester functional groups derived from the glycidyl ester comonomer, and where glycidyl acrylate derivatives are employed, such groups will exhibit vinyl functionality. And, by subjecting the ester functionalized copolymers of this invention to hydrolysis, a copolymer having hydroxyl functionality may be obtained. These functional moieties will therefore provide a reactive site for the subsequent synthesis of block copolymers and/or to chemically bind modifiers to the acetal copolymer backbone, for example.

While the invention has been described in connection with what is presently considered to be the most practical and preferred embodiment, it is to be understood that the invention is not to be limited to the disclosed embodiment, but on the contrary, is intended to cover various modifications and equivalents included within the spirit and scope of the appended claims.

What is claimed is:

1. An acetal copolymer comprised of repeating units of the formula:

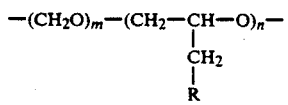

where R is an ester radical, m and n are each integers such that m+n is between 5 to 20000, and the mole ratio of units of subscript n to the units of subscript m is between about 1:5000 to 1.1.

2. An acetal copolymer as in claim 1, wherein said glycidyl ester derivative is a substituted or unsubstituted glycidyl acrylate.

3. An acetal copolymer comprising structural units in the copolymer chain derived from (a) trioxane, and (b) a comonomer of the formula:

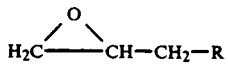

where R is an ester radical.

4. An acetal copolymer as in claim 3, wherein R is a radical selected from acetates and acrylates.

5. An acetal copolymer as in claim 4, wherein R is a methacrylate radical.

6. An acetal copolymer as in claim 3, which further comprises structural units in the copolymer chain derived from at least one additional cyclic ether or cyclic acetal comonomer.

7. A method as in claim 6, wherein said additional comonomer is at least one selected from the group consisting of ethylene oxide, 1,3-dioxolane, 1,3-dioxepane, 1,3-dioxep-5-ene, and 1,3,5-trioxepane.

8. A method of making an acetal copolymer which comprises copolymerizing trioxane and an glycidyl ester comonomer of the formula:

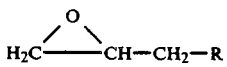

where R is an ester radical.

9. A method as in claim 8, wherein R is a radical selected from acetates and acrylates.

10. An acetal copolymer as in claim 9, wherein R is a methacrylate radical.

11. A method as in claim 8, wherein R is reprented by the formulas:

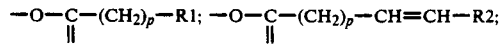

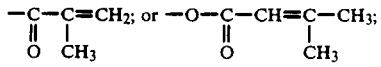

where each p is an integer from zero to 8, R1 is a methyl or phenyl radical, and R2 is hydrogen or a methyl or phenyl radical.

12. A method as in claim 8, which further comprises copolymerizing trioxane and the glycidyl ester in the presence of at least one additional cyclic ether or cyclic acetal comonomer.

13. A method as in claim 12, wherein said additional comonomer is at least one selected from the group consisting of ethylene oxide, 1,3-dioxolane, 1,3-dioxepane, 1,3-dioxep-5-ene, and 1,3,5-trioxepane.

14. A method of making an acetal copolymer which comprises copolymerizing trioxane and a glycidyl ester derivative.

15. A method as in claim 14, wherein the glycidyl ester derivative is substituted or unsubstituted glycidyl acrylate.

16. A method of making an acetal copolymer as in claim 15 wherein the glycidyl acrylate is present in the reaction mixture in an amount of greater than about 0.7 mole%.

17. A method of making an acetal copolymer as in claim 10, which further comprises initiating the copolymerization by means of a boron trifluoride initiator.

18. A method as in claim 17, wherein said boron trifluoride initiator is gaseous boron trifluoride or a coordination complex of boron trifluoride.

19. A method as in claim 18, wherein said cooridination complex of boron trifluoride is boron trifluoride etherate.

* * * * *

UNITED STATES PATENT AND TRADEMARK OFFICE
CERTIFICATE OF CORRECTION

PATENT NO. : 4,983,708

DATED : January 8, 1991

INVENTOR(S) : YANG et al

It is certified that error appears in the above-identified patent and that said Letters Patent is hereby corrected as shown below:

Column 7:

Claim 7, line 1, delete "A method" and insert --An acetal copolymer--.

Signed and Sealed this

Thirteenth Day of October, 1992

Attest:

DOUGLAS B. COMER

*Attesting Officer*  *Acting Commissioner of Patents and Trademarks*